US008589880B2

(12) United States Patent
Jones et al.

(10) Patent No.: US 8,589,880 B2
(45) Date of Patent: Nov. 19, 2013

(54) IDENTIFYING A SOFTWARE DEVELOPER BASED ON DEBUGGING INFORMATION

(75) Inventors: Angela Richards Jones, Durham, NC (US); Kaushik Patel, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/372,544

(22) Filed: Feb. 17, 2009

(65) Prior Publication Data

US 2010/0211932 A1 Aug. 19, 2010

(51) Int. Cl.
G06F 9/44 (2006.01)

(52) U.S. Cl.
USPC .............. 717/124; 717/122; 717/140

(58) Field of Classification Search
USPC ............. 717/101–178; 719/313, 320; 714/26, 714/49, 38.14, 38.1, E11.21, E11.207, 714/E11.22, E11.026
See application file for complete search history.

(56) References Cited

U.S. PATENT DOCUMENTS

| 5,771,385 | A | * | 6/1998 | Harper | 717/128 |
| 5,903,897 | A | * | 5/1999 | Carrier et al. | 1/1 |
| 5,960,196 | A | * | 9/1999 | Carrier et al. | 717/122 |
| 6,106,571 | A | * | 8/2000 | Maxwell | 717/131 |
| 6,430,741 | B1 | * | 8/2002 | Mattson et al. | 717/154 |
| 6,944,849 | B1 | * | 9/2005 | Glerum et al. | 717/127 |
| 6,983,446 | B2 | * | 1/2006 | Charisius et al. | 717/113 |
| 7,100,152 | B1 | * | 8/2006 | Birum et al. | 717/131 |
| 7,237,232 | B2 | | 6/2007 | Smith | |
| 7,546,602 | B2 | * | 6/2009 | Hejlsberg et al. | 719/313 |
| 7,562,344 | B1 | * | 7/2009 | Allen et al. | 717/113 |
| 7,644,393 | B2 | * | 1/2010 | Glerum et al. | 717/127 |
| 2004/0230964 | A1 | * | 11/2004 | Waugh et al. | 717/168 |
| 2005/0262484 | A1 | * | 11/2005 | Glerum et al. | 717/130 |
| 2007/0006152 | A1 | * | 1/2007 | Ahmed et al. | 717/122 |
| 2009/0138843 | A1 | * | 5/2009 | Hinton et al. | 717/101 |
| 2009/0327809 | A1 | * | 12/2009 | Joy et al. | 714/26 |

* cited by examiner

*Primary Examiner* — Lewis A Bullock, Jr.
*Assistant Examiner* — Francisco Aponte
(74) *Attorney, Agent, or Firm* — Jeffrey T. Holman

(57) ABSTRACT

A solution for identifying a software developer based on debugging information includes an identification module configured to identify a developer of a line of source code, a determination module configured to determine a developer contact tag for the developer, an encoding module configured to encode the developer contact tag, a tagging module configured to automatically tag the line of source code with the developer contact tag associated with the developer. The solution also includes a debug module configured to provide debug information, a decoding module configured to decrypt the developer contact tag, and a presentation module configured to present the debug stack trace in human readable form.

19 Claims, 4 Drawing Sheets

IDENTIFYING A SOFTWARE DEVELOPER BASED ON DEBUGGING INFORMATION

BACKGROUND OF THE INVENTION

1. Field of the Invention

This invention relates to the identification of software developers by tagging newly created or modified lines of source code with developer contact information.

2. Description of the Related Art

In a global economy the development of software is a national and international business. While this global economy is good for software development it is a challenge for software testers and software maintainers. For example, suppose a particular software application has been in production for one year and crashes, the system automatically generates a debug log including a stack trace. The stack trace is returned to a software maintainer, the software maintainer may not have worked on or developed the program but quickly pinpoints the problem to a function named "GetTables."

Suppose that the software maintainer can see that a buffer overflow occurred, and a fix would be to increase the buffer size. However, suppose a comment in the function says the buffer size must be less than 1000 bytes.

It would be advantageous for the software maintainer to discuss the error and the comment regarding the buffer size, but there is no information regarding the comment who wrote the comment or the line of source code. Consequently, the software maintainer must either change the code in contradiction of the comment or contact multiple other departments or developers in search of one who can provide further background on the comment and the particular line of source code. Either option is not the preferred option as contradicting the comment may lead to additional errors and searching for a developer with the needed background information is time consuming and tedious.

An embodiment of the present invention provides a way to capture information about a developer of a line of source code such as a contact address, name, email address and other appropriate contact information for one or more of the last developers that modified the line of source code. Thus providing a way for the code maintainer or test team to discuss their findings and to discuss the proposed solution with the developer or development team. This would be a benefit to the test team and to the organization because it reduces the risk of introducing new errors into the system due to a lack of knowledge about the code.

A conventional tools do not automatically tags new or modified lines of source code. In conventional tools a developer must manually insert their contact information by way of a comment in the source code. However, these comments are removed when the source code is compiled and so are not available when the application is being debugged. Conventional tools do not automatically tags each line of code with developer information. Additionally, conventional tools do not automatically track the last "n" number of developers. Finally, conventional tools do not encode the developer contact information to protect privacy.

The need exists for a solution that automatically tags new and modified lines of source code. A solution that does not require the developer to manually include text contact information. A solution that encodes the developer contact information and a solution that can keep a history of the developers on a line-by-line bases.

SUMMARY OF THE INVENTION

Embodiments of the present invention has been developed to provide an improved method for identifying a software developer based on debugging information. The method for identifying a software developer based on debugging information is comprised of automatically identifying a developer of a line of source code stored by the developer in a source code repository, determining a developer contact tag for the developer, automatically tagging the line of source code with the developer contact tag associated with the developer, and compiling the line of source code and the developer contact tag into a set of executable code, the set of executable code comprising the developer contact tag in a format compatible for presentation with debug information produced from the executable code.

The solution generates debug information in response to a software failure. The solution determines the developer associated with the line of source code from the debug information by way of the developer contact tag. In certain embodiments, the solution determines that the line of source code is a modified line of source code by comparing a current set of source code to a previous version of the source code. The solution may create the developer contact tag such that the developer contact tag serves as a unique index into a repository of developers. The repository of developers may comprise an entry for each developer, the entry comprising at least a developer communication address and one or more of a developer name and a developer role.

The developer contact tag comprises one or more data fields formatted in plain text human-readable format. Further the solution encodes the developer contact tag such that the debug information includes the encoded developer contact tag. In certain embodiments, encoding the developer contact tag includes encrypting the developer contact tag such that the debug information includes an encrypted developer contact tag. The solution uses the developer contact tag to retrieve a developer communication address and optionally to retrieve one or more of the developer name and the developer role from the entry for the developer from the repository of developers. Finally, the solution in certain embodiments replaces the encoded developer contact tag in the debug information with a developer communication address and one or more of a developer name and a developer role.

An apparatus for identifying a software developer based on debugging information includes an identification module and a debug module. The identification module may include a determination module, an encoding module, and a tagging module. The debug module may include a decoding module and a presentation module. A system for identifying a software developer based on debugging information may include a processor and a memory in communication with the processor. The memory may include an identification module may that include modules and perform operations in similar manner to the apparatus described above. In addition, the same memory or memory in communication with the same processor or a completely different processor may include a debug module. This debug module may include modules and perform operations in similar manner to the apparatus described above.

Reference throughout this specification to features, advantages, or similar language does not imply that all of the features and advantages that may be realized with an embodiment of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
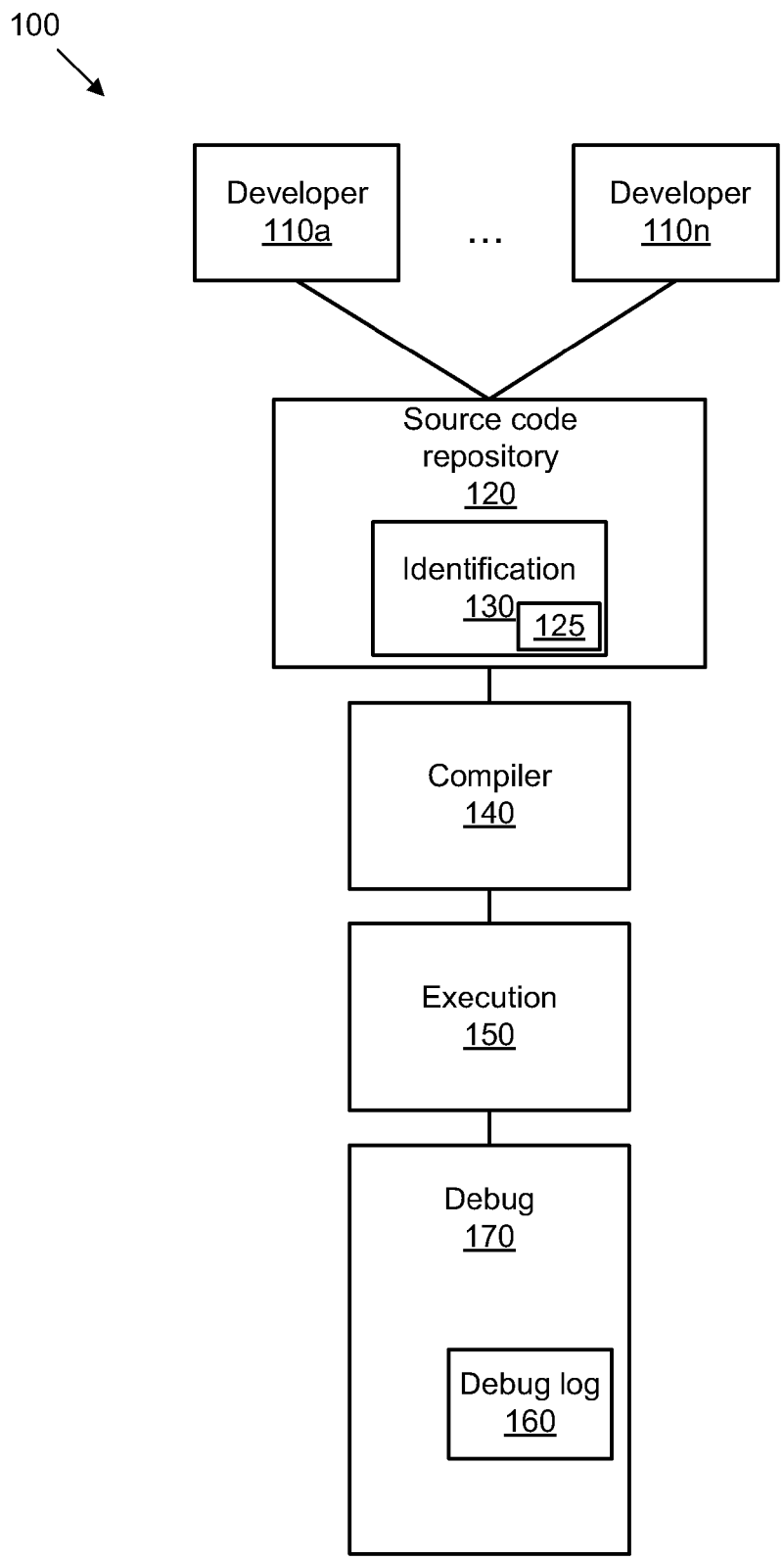
FIG. 1 is an illustration of one embodiment of a system for identifying a software developer based on debugging information, in accordance with one embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, an embodiment of the present invention may be embodied as a method, system, or computer program product. Accordingly, an embodiment of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, an embodiment of the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the identification of software developers by tagging the newly created or modified lines of source code with developer contact information may be written in an object oriented programming language such as Java, Smalltalk, C++ or the like. However, the computer program code for carrying out operations of an embodiment of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of an apparatus for identifying a software developer based on debugging information. The apparatus 100 may include developers 110a-n, a source code repository 120, an identification module 130, code compilation 140, code execution 150, a debug log 160, and a debug module 170.

The developers 110a-n may develop code in a source code development repository that includes an Operating System (OS) and supports basic editors, debuggers, user interface tools, and other testing tools. The OS may be Windows, Macintosh, UNIX, Linux or the like. The OS may support multiple languages, such as 'C', C++, Java, HTML and the like.

The developers 110a-n may develop a workstation application, a servlet, a desktop application, a server application, a client application, a web-based application, and the like. The developers 110a-n may develop on computer hardware similar to that used in a production environment. Alternatively, the developers 110a-n may develop on hardware different from the hardware the code will run on. In one embodiment, for example the developers 110a-n may develop in a Linux development environment on a personal computer (PC). In an alternative embodiment, the developers 110a-n may develop on a Macintosh platform. In yet another embodiment, the developers 110a-n may develop code on a workstation attached over a network, and the actual development environment hosted on a server. The server may be located locally or physically many miles away from the developers 110a-n.

The developers 110a-n may develop a database application, a spreadsheet application, a web application, or the like. The application may interface with other applications within the same physical box or outside of the physical box, and be connected through a network. The developers 110a-n may develop code that may need to pass data, control messages, values, or the like to other code running on the same physical box or anywhere on a network.

In one embodiment, the developers 110a-n development environment may consist of small or large system of laptops, workstations, or mainframe computer. The developers 110a-n may be connected to the source code repository 120 by a global network or a World Wide Web (WWW), the developers 110a-n may be working physically close to each other or they may be developing in a geographically removed locations from each other.

The developers 110a-n may be on the same development team working on the same code, but at different time periods. In particular the developers 110a-n may need to coordinate their work so that one team of developers 110a-n does not alter the work of the second team of developers 110a-n. In addition, a software testing group may be responsible for testing the software. A fourth group of support technicians may be responsible for software maintenance once a software product is put into production.

The software test team and software maintenance technicians do not have intimate knowledge of the software product source code and do not have an understanding of the algorithms, procedures and methods incorporated into the software product source code. Consequently, during testing or when the software product is released to the field and an error is detected the computer may generate among other alarms and notices a stack trace. The stack trace is a log of the software calls made to the operating system, including calls to transfer control between procedures, subroutines and methods. The stack trace may be saved and communicated to the software test or maintenance teams. In certain embodiments, the developers 110a-n also serve on a software test team and/or on the software maintenance team. Using the stack trace the test or maintenance teams may be able to identify the errant procedure, subroutine or method.

While it may be possible to identify the code causing the problem, it may not be possible to identify the root cause the problem or logical errors in the source code without discussing the error with the developers 110a-n who originally wrote or modified the source code. In particular, the test and maintenance teams may not understand why a procedure, subroutine or method was coded in a particular way, and the problem is compounded when multiple developers 110a-n are all developing, fixing, updating, and enhancing a software product.

It would be advantageous for the test team, or maintenance team to contact the developer 110a-n who wrote or last modified the source code to discuss the stack trace in order to root cause the software problem. The advantages are a quick resolution to the problem and a reduced chance of introducing a new problem into the software product due to a lack of understanding concerning the code developed.

Currently, a method does not exist to enable the test or maintenance team to identify the software developer 110a-n of a line of source code. Potential reasons for this may include privacy concerns on behalf of the developers, the fact that in the past software was often written and maintained by a few easy to locate and identify developers, and the increased overhead in retaining this information in a production piece of software.

An embodiment of the present invention implements a method, apparatus, and system to associate developer contact information with one or more lines of source code. In one embodiment, the solution includes an apparatus, method and system to attach or append a software developer contact tag 125 to one or more lines of source code. Individual lines of source code may be tagged or logical groupings of lines may be tagged. For example all lines of a particular method or object may be tagged based on what percentage of the lines of source code had been changed. The contact tag 125 may serve as an identifier of a particular developer 110 in a repository of developers 110a-n.

In one embodiment, the solution may associate a set of developers' contact tags with one or more lines of source code. Each developer in the set may be on the same team, be part of the same department or company division, or may have modified one or more lines of source code at different points in time. Alternatively, or in addition, the set of developers may represent two or more developers who are each competent to assist in explaining why the source code is written as it is and both qualified to assist in resolving a coding error. In this manner, the developer contact tag 125 indicates a plurality of developers that can be contacted to answer questions about why the source code is written as it was (this is context information about the source code). This would allow the test or maintenance team to identify the last set of developers 110a-n that modified the one or more lines of source code.

In one embodiment, the developers 110a-n contact tag is in human readable form. In other words a test or maintenance person would be able to obtain the developers 110a-n communication address by mapping the human readable tag 125 to a repository of developers.

In addition or in an alternative embodiment, it may be desirable to keep the information about developers and/or the developers contact tag 125 itself confidential or private. In such an embodiment, the developer contact tag 125 and the information associated with the developer contact tag 125 may be encoded to restrict the information to the test and maintenance teams. As a result only authorized personnel may obtain the developers 110a-n contact information.

The identification module 130 interacts with the apparatus 100 to identify a developer 110a-n, determine a contact tag, determine if the contact tag should be encoded, and automatically tag the source code with the contact tag. Specifically, the identification module 130 interacts with a source code repository 120 to identify a new or modified line of source code, identify the software developer 110a-n of the line of source code, determine a unique contact tag 125 to use as a unique index into a repository of software developers 212, and automatically tag the lines of source code with the contact tag 125.

In one embodiment, the identification module 130 determines which lines of source code are new and which lines of source code are modified. In one embodiment, the identification module 130 compares a current set of source code to a previous version of the source code to identify the lines of modified source code. The identification module 130 compares the source code checked in by the software developer 110a-n against the source code the software developer 110a-n checked out. The differences between the two revisions of source code may be saved in the repository. The changed lines of source code are the lines that the identification module 130 will tag with the developer contact tag 125.

The identification module 130 may extract the name of the software developer 110 from a communication session between the developer's development environment and the source code repository 120. For example, the source code repository 120 may require developers to login with a user name and/or password. That user name may be associated with a profile for the developer that includes the contact tag 125. Based on the login information or other connection information, the identification module 130 may extract the contact tag 125 from the developer profile. In addition to extracting the contact tag 125, the identification module 130 may extract other software developer information from the profile, such as an email address, a company phone number, a work location and the like.

Developers check out lines of source code in order to make changes. Once the changes are made the source code is checked back into the source code repository 120. In one embodiment, once the source code is checked in the identification module 130 determines the identification of the software developer 110 of one or more lines of source code that changed from the last time the source code was checked out. The identification module 130 also identifies which lines of source code have changed. In particular, the identification module 130 compares the checked in source code with a previous revision of the source code to identify the source code differences. The identification module 130 determines the identity of the software developer 110a-n for each changed line of source code.

In one embodiment, the identification module 130 may determine a developer contact tag for a set of developers. The developer that provided the current set of source code to the repository 120 is a member of that set of developers. Each member of the set of developers is competent to provide context for the source code. This context includes why the source code was written to begin with as was as why certain modification have been made to the source code.

In one embodiment, the identification module 130 may comprise a software module that resides with the source code repository 120. In an alternative embodiment, the identification module 130 resides outside of source code repository 120, but interfaces with the source code repository 120 to obtain lines of source code and tag lines of source code with the contact tag.

The identification module 130 associates a developer contact tag 125 with one or more lines of source code. In one embodiment, the developer contact tag 125 is associated with each line of the source code. In another embodiment, the developer contact tag 125 is associated with particular lines of source code for example lines of source code that call other functions or methods may be associated with the developer contact tag 125 while individual lines within a function or method may not have an associated developer contact tag 125. In yet another embodiment, the identification module 130 may associate the developer contact tag 125 with a whole software object or method within a software object rather than each line of source code within the object. Those of skill in the art will recognize that the identification module 130 may be configured to associate a developer contact tag 125 with lines of source code as explained above or in various other combinations that are still within the scope of an embodiment of the present invention.

In one embodiment, the identification module 130 appends the developer contact tag 125 for the software developer 110 to the one or more lines of source code such that the developer contact tag 125 is not recognized by the compiler as source code and the developer contact tag 125 is not compiled by the compiler. For example, a special character or token may be used with the developer contact tag 125 such that the compiler ignores the developer contact tag 125.

Alternatively, or in addition, in certain embodiments the identification module 130 appends or inserts the developer contact tag 125 in such a manner that the developer contact tag 125 is only available when the executable code is being debugged. In certain embodiments, the developer contact tag 125 includes a special token or character such that the developer contact tag 125 is compiled into the executable code for use in a stack trace. Alternatively, developer contact tag 125 is compiled when a compiler debug is option enabled.

The compiler 140 compiles the source code into executable code. In certain embodiments, the compiler 140 incorporates the developer contact tag 125 as part of debug information for the executable code. The debug information may include information such as a line number of the line of source code that was last executed, which function/method or object includes that line of source code and which function/method or object will be called next. The compiler 140 may support C/C++, Java or the like. The source code is compiled such that if a software failure occurs a stack trace can be generated. The debug stack trace includes an identifier of the function/method/object that includes the line of source code, a source code line number, and the developer contact tag 125.

The execution module 150 executes the code on a computing system. The computing system may be a standalone workstation, a workstation connected to a network, a mainframe or the like. If an error occurs, the execution module 150 generates a debug log 160. The debug log may include an explanation of the error, a debug stack trace of the procedures, subroutines or methods called, source code line numbers, and a software developer contact tag 125.

Below is an example of a debug stack trace that includes a plain-text human readable developer contact tag 125.

--- java.lang.Exception: No maxattribute of maxviewcolumn
RECONCILINK ACTCINUM (Util.buildCreateViewStatment)
    at psdi.configure.Util.buildCreateViewStatement(Util.
    java:1010:U123456)
    at psdi.configure.Unlcvt.createTablesAndViews(Unlcvt.
    java:401:U123456)
    at psdi.configure.Unlcvt.process(Unlcvt.java:158:U234527)
    at psdi.configure.Unlcvt.main(Unlcvt.java:903:U123456)

---

Example 1

In Example 1 each line of the stack trace includes certain useful debug information. The last line "at psdi.configure-.Unlevt.main(Unlevt.java:903:U123456)" indicates the function that was called "psdi.configure.Unlcvt.main," the module involved "(Unlevtjava," the line number, ":903:," and the developer contact tag 125 "U123456." In this embodiment, the developer contact tag 125 is a plain-text human readable sequence of alphanumeric characters. In certain embodiments, the developer contact tag 125 may include a developer's name, a developer's initials, a company department label, or the like. Alternatively, or in addition, the sequence or structure may not be obvious without a map showing the relationship of the developer contact tag 125 to the software developer 110. The characters may be all alpha or all numeric, no presumed order or length is implied in the examples shown. In one embodiment the developer contact tag 125 is at the end of the debug stack trace line, but the developer contact tag 125 may be included anywhere within the debug stack trace line or before or after the associated debug stack trace line.

The debug module 170 interacts with the system to present a debug stack trace. The debug module 170 may present the stack trace in a graphical user interface (GUI) on an output device, or printed, in a disk file or the like.

In particular, in one embodiment the debug module 170 decodes or decodes a contact tag 125 and presents a stack trace with a developer communication address. In one embodiment, the debug module 170 maps the developer contact tag 125 to the software developer 110a-n communication address and presents the stack trace with the software developer 110a-n communication address. Additionally, the debug module 170 decodes the encoded software developer contact tag 125, maps the decoded contact tag 125 to a developer communication address and presents the communication address.

Below is an example of the stack trace after the debug module 170 has mapped the contact tag to a developer 110a-n in a repository of software developers to retrieve the developer communication address.

--- java.lang.Exception: No maxattribute of maxviewcolumn
RECONCILINK ACTCINUM (Util.buildCreateViewStatment)
    at psdi.configure.Util.buildCreateViewStatement(Util.
    java:1010:john.doe,john.doe@ibm.com)
    at psdi.configure.Unlcvt.createTablesAndViews(Unlcvt.
    java:401:mike.doe,mike.doe@ibm.com)
    at psdi.configure.Unlcvt.process(Unlcvt.java:158:
    rjones,developer1@ibm.com)
    at psdi.configure.Unlcvt.main(Unlcvt.
    java:903:ksmith,developer2@ibm.com)

---

Example 2

In Example 2 the encoded developer contact tag 125 i.e. "U123456." Has been replaced with a decoded developer contact tag 125 that includes the username of the developer and the email address for the developer. In the last line we see that "ksmith" is the developer who last modified line 903 and "ksmith" can be reached by emailing "developer2@us.ibm.com." with this type of information a debug team can contact "ksmith" and gain a better understanding of why the source code was written the way it was.

Figure 2:
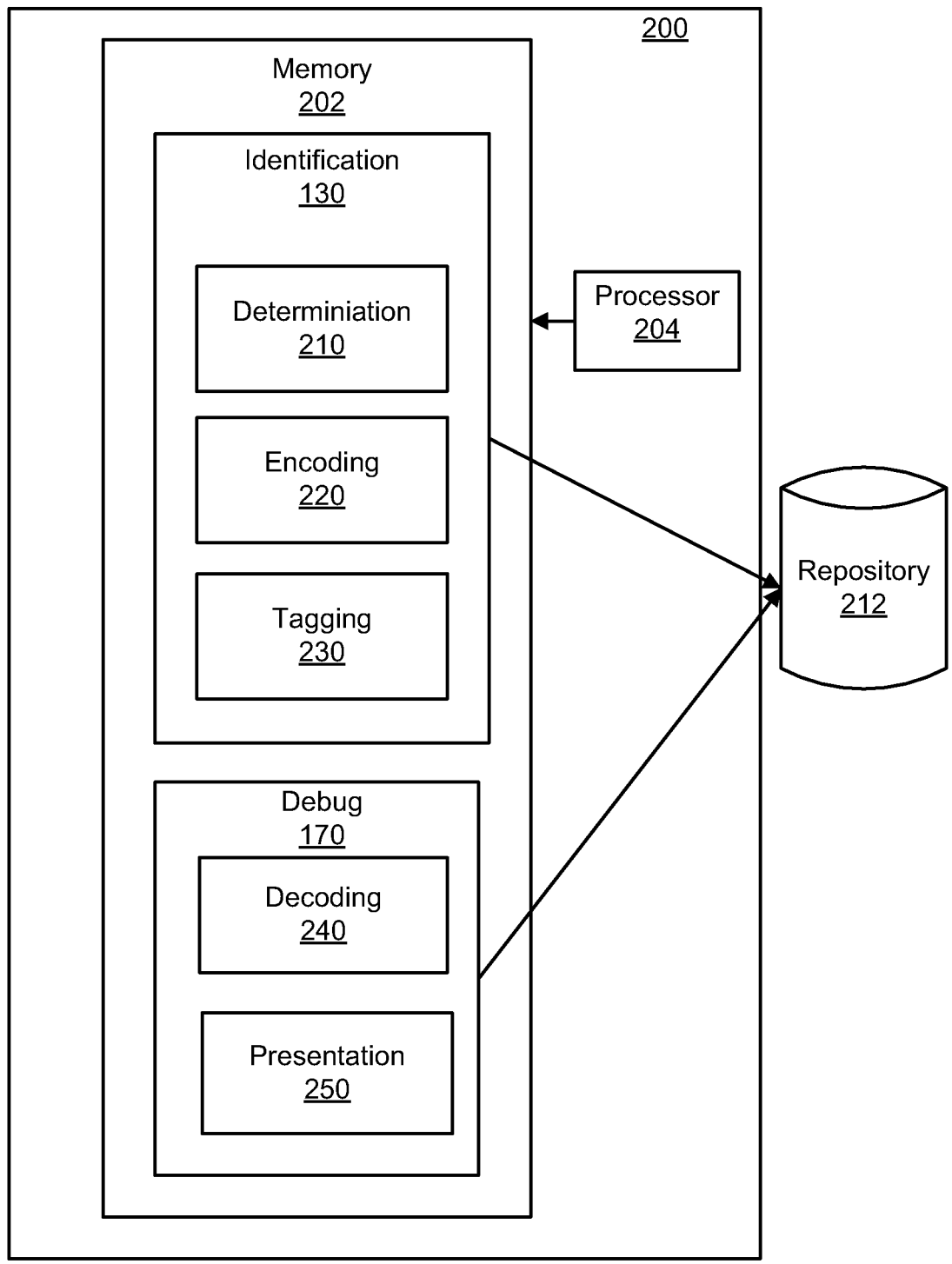
FIG. 2 is a block diagram illustrating one embodiment of a system for identifying a software developer based on debugging information, in accordance with one embodiment of the present invention.

FIG. 2 illustrates one embodiment of a system for identifying a software developer based on debugging information. The system 200 includes a memory 202, a processor 204, an identification module 130, a determination module 210, an encoding module 220 and a tagging module 230. In addition, the system 200 includes a debug module 170, a decoding module 240, and a presentation module 250.

The processor 204 and memory 202 comprise hardware components well known to those in the art and may comprise a general purpose processor, a special purpose processor, such as an ASIC or the like. The memory 202 may comprise RAM, ROM, cache memory or the like.

The determination module 210 interacts with the system to determine a software developer 110a-n of a line of source code. In particular the determination module 210 determines a unique contact tag to serve as an index into a repository of developers 110a-n. Additionally, the determination module 210 determines the role of the software developer 110a-n. In particular, the determination module 210 determines if the software developer 110a-n is the creator or modifier of the line of source code. Additionally, the determination module 210 may determine how many times the line of source code has been modified and by whom.

In one embodiment, the determination module 210 creates a developer contact tag 125. The developer contact tag 125 is a unique identifier of the developer. The determination module 210 may create the developer contact tag 125 when a developer is set up to use a source code repository 120. In certain embodiments, the developer contact tag 125 is an index into a repository of developers 212. In one embodiment, each software developer 110a-n may have an entry in the repository of software developers 212. Alternatively, or in addition, a group or team of developers may be associated with a single developer contact tag 125.

In one embodiment, the determination module 210 may determine a developer contact tag for a set of developers. The developer that provided the current set of source code to the system 200 is a member of that set of developers. Each member of the set of developers is competent to provide context for the source code. This context includes why the source code was written to begin with as was as why certain modification have been made to the source code.

In one embodiment, the determination module 210 may search the repository of software developers 212 for the software developer name. The determination module 210 may compare each entry in a table of software developers 110a-n with the software developer name extracted by the identification module 130. If a match is found, the index into the repository of software developers 212 becomes the developer contact tag. In one embodiment, if the determination module 210 does not find a match between a software developer name and an entry in the repository of software developers 212, the determination module 210 adds the software developer name to the repository of software developers 212 and assigns the index to the entry in the table as the developer contact tag 125.

In an alternative embodiment, the determination module 210 may compare an email address of the software developer 110a-n extracted by the identification module 130 when the source code was checked into the source code repository 120. If a match is found between the email address and an entry in the repository of software developers 212, the index into the repository of software developers 212 may be used as the contact tag 125. Alternatively, the determination module 210 may compare employee numbers or other unique developer identifiers.

The repository of software developers 212 holds software developer entries. In one particular embodiment, the entries comprise a developer communication address, a developer name, and a developer role. In one embodiment, the developer role is either creator or modifier to represent whether the developer created or modified the line of source code. The repository of software developers 212 interacts with the identification module 130 and the debug module 170 to map a contact tag to a software developer communication address.

In one embodiment, the repository of software developers 212 may be predetermined and populated with software developer names, emails, phone numbers, and the like. In one embodiment, if the determination module 210 does not find the software developer name or email address in the repository of software developers 212 the determination module 210 may generate an error message, such as "software developer not found."

The encoding module 220 interacts with the system to encode a contact tag. The encoding module 220 may provide multiple levels of protection of the identifying information of the contact tag. In one embodiment, the encoding module 220 scrambles or otherwise encodes a text representation of the contact tag according to a well know algorithm. In another embodiment, the encoding module 220 protects the identity of a software developer 110a-n from being discovered by running the contact tag through an encryption algorithm with a cipher key to encrypt the contact tag.

In one embodiment, the determination module 210 may call the encoding module 220 to encode the developer contact tag. The encoding module 220, in certain embodiments, may use a cipher key to encrypt the plain-text human readable developer contact tag to make it unreadable. In one embodiment, the determination module 210 may call the encoding module 220. The determination module 210 may pass the developer contact tag and optionally a cipher key as parameters to the encoding module 220. The encoding module 220 may encode the developer contact tag without using a cipher key or encrypt the developer contact tag using the cipher key and then return the encoded developer contact tag to the determination module 210.

In an alternative embodiment, the determination module 210 may pass the developer contact tag to the encoding module 220. The encoding module 220 may read from a password protected repository to obtain the cipher key. The encoding module 220, in one embodiment, may encrypt the developer contact tag using the cipher key and return an encoded developer contact tag to the determination 210 module.

In yet another embodiment, the encoding module 220 may, after encoding the developer contact tag, call the tagging module 230 to tag the line of source code created or modified by the software developer 110 and saved in the source code repository 120.

In one embodiment, the optional encoding module 220 may be circumvented. In this embodiment, the determination module 210 determines the developer contact tag and calls the tagging module 230 directly without calling the encoding module 220. In this embodiment, the developer contact tag may be in plain-text human readable format.

The tagging module 230 interacts with the system to tag a line of source code with a contact tag. In particular the tagging module 230 appends or inserts the contact tag to the line of source code, either encoded or non-encoded. In one embodiment, the tagging module 230 may enclose the developer contact tag with a beginning and ending delimiter. In one embodiment, the delimiters may comprise white space or special characters that are not being used as special characters either in the plain-text human readable form or in the encoded form of the developer contact tag.

In one embodiment, the encoding module 220 may call the tagging module 230. The tagging module 230 may receive the encoded developer contact tag as a parameter from the encoding module 220. The tagging module 230 may index into the source code repository 120 to read the line of source code created or modified by the software developer 110a-n. The tagging module 230 may append the encoded developer contact tag to the line of source code, and store the line of source code with the encoded developer contact tag in the source code repository 120. Alternatively or in addition, the tagging module 230 may combine the encoded developer contact tag with a tag representative of debugging information. The tag representative of debugging information may indicate the source code line number and/or the object, method, or module that includes that line of source code. Alternatively or in addition, the tagging module 230 may append the encoded developer contact tag with the tag representative of debugging information.

--- tableNames= new JcomboBox( ); !@6*&
tableNames.addActionListener(this); #$^79#

Example 3

Example code 3 illustrates a line of source code, with an encoded developer contact tag appended to the end.

Example 4

```
tableNames= new JcomboBox( ); U123456
tableNames.addActionListener(this); U987456
```

Example code 4, illustrates a line of source code, with a plain-text human readable developer contact tag.

The debug module 170 interacts with the system to receive a debug log 160, decode a contact tag and present a stack trace, debug log or other form of debug information. In particular the debug module 170 receives a debug stack trace, determines if the contact tag is decoded and presents the debug stack trace to a user. In one embodiment, a software failure occurs and a debug log 160 is generated. A software developer 110a-n or maintainer supplies the debug log 160 to the debug module 170. In one embodiment, the debug log 160 may comprise a debug stack trace and may comprise an explanation of the software failure, followed by a debug stack trace of calls to modules, subroutines, functions and the like. The debug stack trace may include the name of the method called, the location where it was called from, the line number of the source code where the error occurred and the developer contact tag. The developer contact tag may be plain-text human readable, or may be encoded.

In one embodiment, the debug module 170 reads the debug stack trace and determines that the developer contact tag is encoded and calls the decoding module 240. The decoding module 240 may read a password protected file to retrieve an encryption key in embodiments in which the encoded developer contact tag has been encrypted. Using the encryption key the decoding module 240 may decrypt the developer contact tag into a plain-text human readable format.

The decoding module 240 decodes the encoded contact tag. In certain embodiments, the decoding module 240 runs a reverse scrambling algorithm in order to decode the developer contact tag and restore it to its original text format. In other embodiments that use encryption, the encoding module 240 receives an encoded contact tag, the decoding module 240 runs the encoded contact tag through a decryption algorithm with a cipher key to obtain a human readable contact tag. In one embodiment, the decoding module 240 indexes into the repository of software developers 212 with the human readable contact tag to obtain the developer 110a-n contact tag.

In one embodiment, the decoding module 240 may replace the encoded developer contact tag in the debug stack trace with a plain-text human readable developer contact tag. The plain-text human readable developer contact tag may comprise a developer communication address and contain one or more of a developer name and developer role.

In an alternative embodiment, the developer contact tag may server as a unique index into the repository of software developers 212. The decoding module 240 may retrieve the developer communication address from the repository of software developers 212 using the developer contact tag as an index the developer communication address containing one or more of a developer name and developer role.

In one embodiment, the decoding module 240 may call the presentation module 250 to present the debug stack trace to a user. The presentation module 250 may call a graphical user interface (GUI) (not shown) to present the debug stack trace to a user.

The presentation module 250 presents the stack trace. In particular the debug module 170 or the decoding module 240 may call the presentation module 250 to present the debug stack trace. In one embodiment, the presentation module 250 may present the debug stack trace with the appended contact tag in human readable form as depicted in Example 5.

```
java.lang.Exception: No maxattribute of maxviewcolumn
RECONCILINK ACTCINUM (Util.buildCreateViewStatment)
    at psdi.configure.Util.buildCreateViewStatement(Util.
    java:1010:U123456)
    at psdi.configure.Unlcvt.createTablesAndViews(Unlcvt.
    java:401:U983456)
    at psdi.configure.Unlcvt.process(Unlcvt.java:158:U234527)
    at psdi.configure.Unlcvt.main(Unlcvt.java:903:U23456)
```

Example 5

In Example 6, the presentation module 250 presents the debug information with the developer 110a-n communication information as depicted below.

```
java.lang.Exception: No maxattribute of maxviewcolumn
RECONCILINK ACTCINUM (Util.buildCreateViewStatment)
    at psdi.configure.Util.buildCreateViewStatement(Util.
    java:1010:john.doe,john.doe@ibm.com,c)
    at psdi.configure.Unlcvt.createTablesAndViews(Unlcvt.
    java:401:mike.doe,mike.doe@ibm.com,m)
    at psdi.configure.Unlcvt.process(Unlcvt.java:158:
    rjones,r.jones@ibm.com,c)
    at psdi.configure.Unlcvt.main(Unlcvt.
    java:903:kpatel,k.patel@ibm.com,c)
```

Example 6

In one embodiment, the presentation module 250 may present the debug stack trace on a graphical user interface (GUI). In an alternative embodiment, the presentation module 250 may present the debug stack trace on a printer, a disk file, or the like.

In an alternative embodiment, the debug module 170 may pass an decryption key/encryption key and the developer contact tag as parameters to the decoding module 240. After the decoding module 240 decrypts the developer contact tag using the decryption key/encryption key, the decoding module 240 may return the developer decoded contact tag to the debug module 170. The debug module 170 may pass the debug information such as a debug stack trace and the developer contact tag to the presentation module 150 to present the debug information to the user.

In an alternative embodiment, the debug module 170 may use the developer 110a-n contact tag as a unique index into the repository of software developers 212. The debug module 170 retrieves the developer 110a-n communication address and one or more of a developer name and developer role. Then the debug module 170 may call the presentation module 250 with the debug stack trace and the developer communication address.

In an alternative embodiment, the debug module 170 may determine that the developer 110a-n contact tag is not encrypted and use the developer 110a-n contact tag to search the repository of software developers 212 to retrieve the developer 110a-n communication address. Then the debug module 170 may pass the debug information and developer communication address to the presentation module 250.

In one embodiment, the debug stack trace may be generated while executing the code at a customer site. In one embodiment, the customer may execute multiple test case scenarios both white box and black box testing. The customer may then transmit the debug stack traces and failure modes to the factory for analysis. In this embodiment, those reviewing the debug stack trace can use the developer communication address to gain further insights regarding the source code and how this may or may not relate to the particular error being experienced. Those reviewing can analyze the different scenarios and failure modes and consult with the developers to discover why one test scenario may work and another may not.

Figure 3:
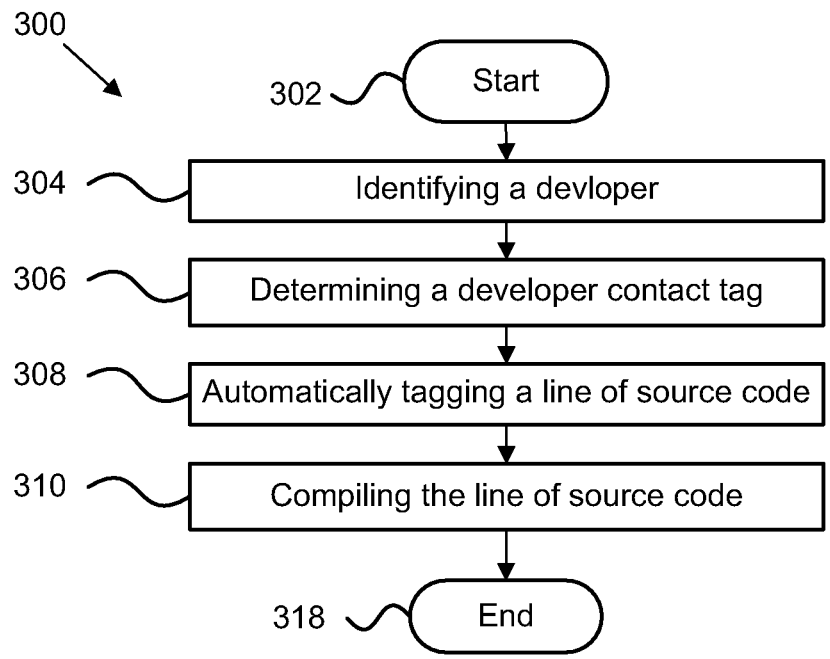
FIG. 3 is a schematic flow chart diagram illustrating one embodiment of a method for identifying a software developer based on debugging information, in accordance with one embodiment of the present invention.

FIG. 3 illustrates one embodiment of a method for identifying a software developer 110a-n based on debugging information. The operations may be implemented by the executed operations of a computer program product. The method 300 begins 302 when source code that has been created or modified is checked into a source code repository 120. The identification module 130 identifies 304 the software developer 110a-n. Next the determination module 220 determines a contact tag and automatically tags the line of source code in the source code repository 120 with the contact tag. Lastly, a compiler, compiles the source code with the software developer 110a-n contact tag appended.

Figure 4:
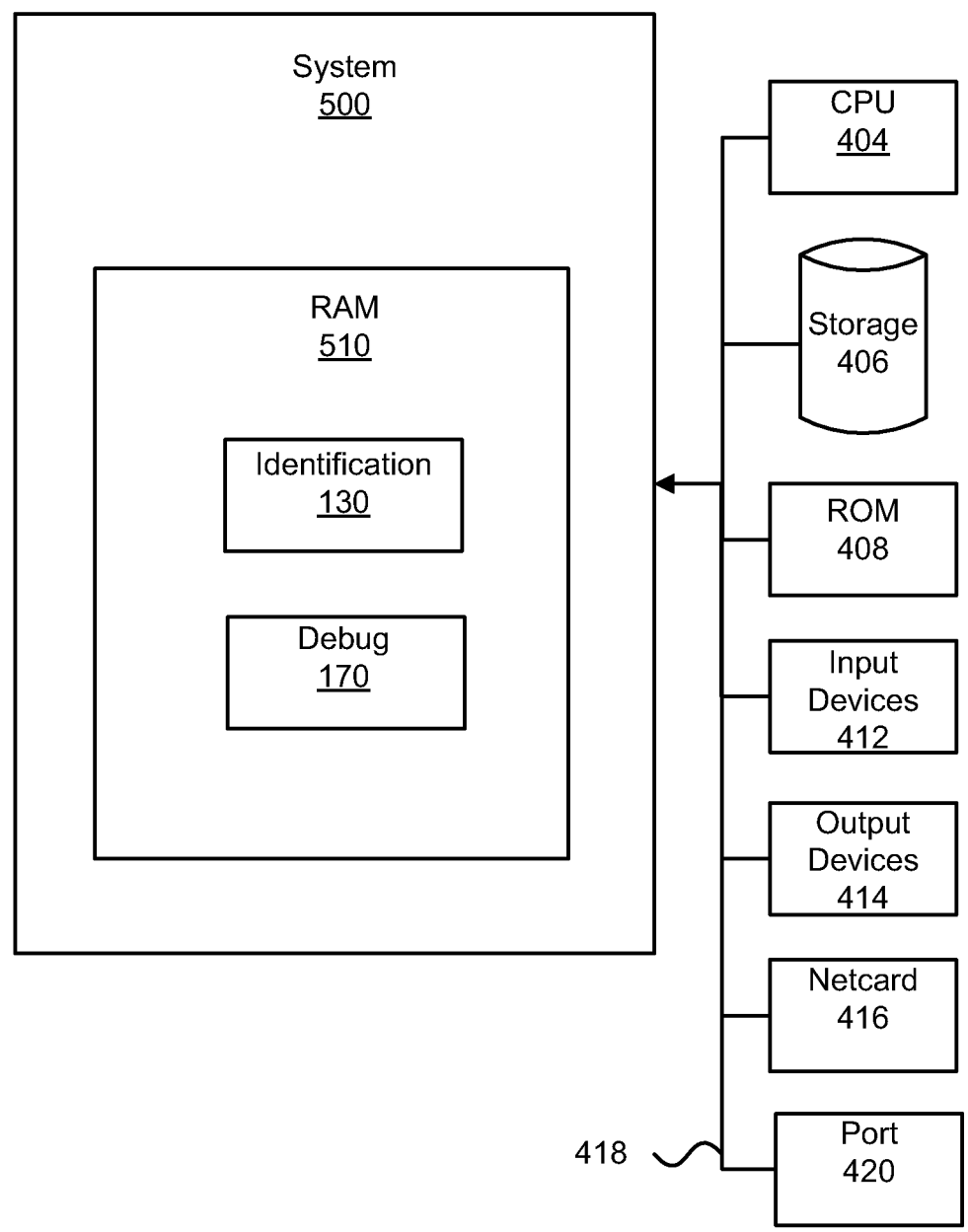
FIG. 4 is a block diagram of one embodiment of a hardware system for identifying a software developer based on debugging information, in accordance with one embodiment of the present invention.

FIG. 4 illustrates a schematic block diagram of one embodiment of an electronic device in accordance with the identification of software developers by tagging the newly created or modified lines of source code with developer contact information. In certain embodiments, the electronic device is a desktop computer. Nevertheless, the device may constitute any type of electronic equipment, including a tablet computer, a PDA, and the like.

The device, hereinafter by way of example a desktop may include a processor or CPU 404. The CPU 404 may be operably coupled to one or more memory devices. The memory devices may include a non-volatile storage device 406 such as a hard disk drive or CD ROM drive, a read-only memory (ROM) 408, and a random access volatile memory (RAM) 510.

The desktop in general may also include one or more input devices 412 for receiving inputs from a user or from another device. The input devices 412 may include a keyboard, pointing device, touch screen, or other similar human input devices. Similarly, one or more output devices 414 may be provided within or may be accessible from the desktop. The output devices 414 may include a display, speakers, or the like. A network port such as a network interface card 416 may be provided for connecting to a network.

Within an electronic device such as the desktop, a system bus 418 may operably interconnect the CPU 404, the memory devices 404, the input devices 412, the output devices 414, the network card 416, and one or more additional ports. The ports may allow for connections with other resources or peripherals, such as printers, digital cameras, scanners, and the like.

The desktop also includes a power management unit in communication with one or more sensors. The power management unit automatically adjusts the power level to one or more subsystems of the desktop. Of course, the subsystems may be defined in various manners. In the depicted embodiment, the CPU 404, ROM 408, and RAM 510 may comprise a processing subsystem. Non-volatile storage 406 such as disk drives, CD-ROM drives, DVD drives, and the like may comprise another subsystem. The input devices 412 and output devices 414 may also comprise separate subsystems.

What is claimed is:

1. A method for identifying a software developer based on debugging information, the method comprising:
    automatically identifying a developer of a line of source code stored by the developer in a source code repository;
    determining a developer contact tag for the developer;
    automatically tagging the line of source code with the developer contact tag associated with the developer;
    compiling the line of source code into a set of executable code, the set of executable code comprising the developer contact tag in a format compatible for presentation with debug information produced from the executable code, the debug information comprising:
        a line number of the line of source code that was last executed;
        a function that includes the line of source code last executed; and
        a function that will be called next;
    generating a stack trace in response to a failure when compiling the source code, the stack trace comprising:
        an identifier of the function that includes the line of source code;
        a source code line number; and
        the developer contact tag; and
    determining the developer associated with the line of source code from the debug information by way of the developer contact tag.

2. The method of claim 1, further comprising determining that the line of source code is a modified line of source code by comparing a current set of source code to a previous version of the source code.

3. The method of claim 1, wherein determining the developer contact tag for the developer comprises creating the developer contact tag such that the developer contact tag serves as a unique index into a repository of developers, the repository of developers comprising an entry for the developer, the entry comprising at least a developer communication address and one or more of a developer name and a developer role.

4. The method of claim 3, further comprising retrieving the developer communication address based on the developer contact tag and retrieving one or more of the developer name and the developer role from the entry for the developer from the repository of developers.

5. The method of claim 1, wherein the developer contact tag comprises one or more data fields formatted in plain text human-readable format and further comprising encrypting the developer contact tag such that the debug information includes the encoded developer contact tag.

6. The method of claim 5, further comprising replacing the encoded developer contact tag in the debug information with a developer communication address and one or more of a developer name and a developer role.

7. An apparatus for identifying a software developer based on debugging information, the apparatus comprising:
    a display device;
    an identification module configured to identify one or more lines of source code as modified lines of source code by comparing a current set of source code provided by a developer to a previous version of the source code and configured to identify the developer of the modified lines of source code, the module comprising;
        a determination module configured to determine a developer contact tag for the developer;

an encoding module configured to encode the developer contact tag;

a tagging module configured to automatically tag the modified lines of source code with the encoded developer contact tag associated with the developer, the modified lines of source code tagged such that the developer contact tag is available in a debugging information of executable code generated from the modified lines of source code, the debugging information comprising a source code line number that was last executed and/or a function that includes the line of source code that was last executed, and/or a function that will be called next;

a debug module configured to provide the debugging information for the executable code, and generate a stack trace comprising:

a name of the function;

a location where the function was called;

the line number of the source code where the failure occurred; and the developer contact tag; and determine the developer associated with the line of source code from the debug information by way of the developer contact tag, the module comprising, a decoding module configured to decode the developer contact tag; and a presentation module configured to present the debugging information on the display device, wherein the debugging information comprises text information in human readable form.

8. The apparatus of claim 7, further comprising, generating the debug information in response to a software failure and searching the debug information for the developer contact tag associated with the modified lines of source code.

9. The apparatus of claim 7, wherein determining the developer contact tag for the developer comprises creating a unique identifier for the developer who last modified the modified lines of source code, the developer contact tag indexing a repository of developers, the repository of developers comprising an entry for the developer, the entry comprising at least a developer communication address and one or more of a developer name and a developer role.

10. The apparatus of claim 9, further comprising retrieving the developer communication address and one or more of the developer name and the developer role from the entry for the developer from the repository of developers.

11. The apparatus of claim 7, wherein the decoding module replaces the encoded developer contact tag in the debug information with a developer communication address and one or more of a developer name and a developer role.

12. The apparatus of claim 7, wherein the developer contact tag comprises one or more data fields formatted in plain text human-readable format.

13. The apparatus of claim 7, further comprising presenting the debug information comprising the modified lines of source code and the developer communication address and one or more of the developer name and the developer role to a user in a Graphical User Interface (GUI).

14. The apparatus of claim 7, wherein the determination module is further configured to determine a developer contact tag for a set of developers and the developer that provided the current set of source code is a member of that set of developers, each member of the set of developers is competent to provide context for the source code.

15. A system for identifying a software developer based on debugging information, the system comprising:

a processor;

a memory in communication with the processor, the memory comprising;

an identification module configured to identify a developer of a line of source code, the module comprising;

a determination module configured to determine a developer contact tag for the developer;

an encoding module configured to encode the developer contact tag;

a tagging module configured to automatically tag the line of source code with the developer contact tag associated with the developer;

a debug module configured to provide debugging information of executable code, the debug information comprising a source code line number that was last executed and/or the function that includes the line of source code that was last executed, and/or a function that will be called next; and in response to a software failure, generating a stack trace comprising:

the name of the function called;

the location where the function was called;

the line number of the source code where the failure occurred; and the developer contact tag; and determine the developer associated with the line of source code from the debug information by way of the developer contact tag, the module comprising;

a decoding module configured to decode the developer contact tag associated with the line of source code; and a presentation module configured to present the debugging information, comprising text in human readable form.

16. The system of claim 15, further comprising, obtaining the debug information and searching the debug information for the developer contact tag associated with the line of source code.

17. The system of claim 15, wherein the encoded developer contact tag comprises a developer communication address and one or more of a developer name and a developer role.

18. The system of claim 17, further comprising replacing the encoded developer contact tag in the debug information with the developer communication address and one or more of the developer name and the developer role.

19. The system of claim 18, further comprising presenting the debug information comprising the line of source code and the developer communication address and one or more of the developer name and the developer role to a user in a Graphical User Interface (GUI).

* * * * *